(No Model.)
L. B. WRIGHT.
PACKING DEVICE FOR ELEVATOR PISTONS.
No. 549,419.     Patented Nov. 5, 1895.
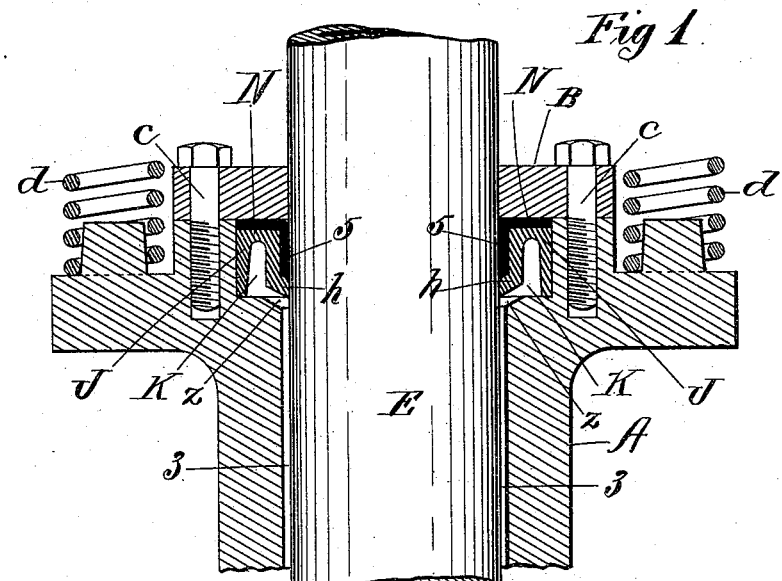
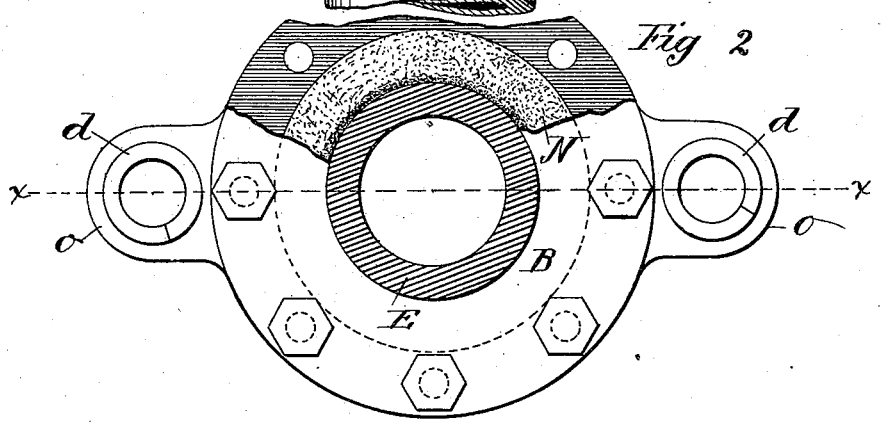
WITNESSES.
INVENTOR.
Lewis B Wright.
by Chapin & Co
ATTY'S

UNITED STATES PATENT OFFICE.

LEWIS B. WRIGHT, OF SPRINGFIELD, MASSACHUSETTS.

PACKING DEVICE FOR ELEVATOR-PISTONS.

SPECIFICATION forming part of Letters Patent No. 549,419, dated November 5, 1895.

Application filed September 19, 1895. Serial No. 562,979. (No model.)

*To all whom it may concern:*

Be it known that I, LEWIS B. WRIGHT, a citizen of the United States of America, residing at Springfield, in the county of Hampden and State of Massachusetts, have invented new and useful Improvements in Packing Devices for Elevator-Pistons, of which the following is a specification.

This invention relates to improvements in elevators and to that class thereof which are actuated by hydraulic pressure against a cage-lifting piston, the object being to provide improved means in the piston-receiving cylinder for packing the latter, whereby a tight joint is made and the usual frequent replacement of the packing is obviated; and the invention consists in the peculiar construction and arrangement of the packing elements and the cylinder, all as hereinafter fully described, and more particularly pointed out in the claims.

In the drawings forming part of this specification, Figure 1 is a side elevation of a section of the piston of a hydraulic elevator and a vertical section of the upper end of the cylinder which receives said piston, having piston-packing devices applied thereto embodying my improvements. Fig. 2 is a plan view of the upper end of said cylinder, showing the packing-cover partly broken away. The sectional view of Fig. 1 is about on line $x$ $x$, Fig. 2.

It has been found in practice very difficult to provide a packing for elevator-pistons of this class which is effective in producing a tight joint and possesses durability. A rubber packing-ring has heretofore been used which bears directly against the surface of the piston. Such a ring, however, is practically a failure for the following reasons: It must be quite resilient to provide quick action against the piston from the force or water-pressure and must permit of the application of a proper lubricant between it and the piston. The said proper resiliency tends to permit the distortion or bulging of the packing by reason of said pressure and causes leakage, and since rubber is disintegrated or much softened by the contact of lubricants therewith the life of such a ring is of short duration and the cost of its replacement is considerable. Neglect to lubricate a rubber ring causes it to so adhere to the piston that it soon becomes torn and destroyed.

The essential object of my improvements, as below described, is to provide packing devices for the aforesaid use which shall obviate said inconveniences.

In the drawings, A is the cylinder which receives the cage-elevating piston E, the latter being actuated to move upwardly in the usual manner by the introduction of water under great pressure into the lower extremity of said cylinder.

B indicates the packing-holding cover, which is secured on the end of the cylinder by bolts $c$. In the end of the cylinder, under said cover B, an annular packing-chamber is formed, as shown in Fig. 1, and the cylinder below said chamber is of a diameter somewhat greater than that of the piston, thereby forming a water-passage 3 in constant communication with said packing-chamber. The edge of the base of said packing-chamber at $z$, adjoining the side of the piston E, is chamfered off, as shown. The surface of said chamfered part of the base of the packing-chamber forms the lower wall of an annular water-passage leading into an annular chamber K in the internal portion or member of the piston-packing, as below described. Said internal packing-member J consists of a ring of india-rubber having a laterally and downwardly projecting annular lip $h$ around its inner lower edge and the annular chamber K therein. The lower surface of said lip $h$, lying opposite the said chamfered portion of the base of the packing-chamber, forms the upper wall of said annular passage leading to the interior of the said packing member J and communicating with the annular chamber K therein and forming a conduit connecting the said water-passage 3 and said chamber K in the packing-ring J. The edge of said lip $h$ extends to or nearly to the surface of the piston E, as shown. A reinforcing packing-ring is applied to the said ring J, consisting of a flat leather ring N, extending from the piston E over and lying on the upper edge of said ring J, its border extending to the outer wall of said packing-chamber in the cylinder, as shown, and a depending flange 5, integral with said ring N, extending at right angles to said flange from its inner border to the upper side of said lip $h$ and abutting thereagainst. The inner surface of said flange 5 is adapted to impinge against the surface of the piston E, as below described.

The above-described leather-packing element, consisting of the ring N and flange 5, constitutes a reinforcing-ring for the rubber ring J, covering the above-referred-to surfaces of the latter. The depending flange 5 of said leather ring has one side thereof presented to bear directly against the piston and the opposite side thereof covers all of that part of the chambered rubber ring J which extends in a line substantially parallel to the side of the piston E. The said leather flange 5 is exposed to the effect of the lubricant which is applied to the piston, and thus the rubber ring is protected therefrom. The action of a lubricant upon leather is, as is well known, beneficial rather than otherwise. The ring N of said reinforcing-ring covers the entire upper edge of said ring J, and the packing-cover B, secured to the cylinder, as described, holds said ring N firmly against the ring J. The water-pressure in the annular passage $z$ causes the edge of the lip $h$ to be held more or less closely against the piston and against the lower edge of the leather flange 5, and thereby the said annular passage $z$ is maintained.

The action of the above-described devices is as follows: A proper lubricant is applied through a suitable opening in the plate B to the leather ring or directly to the surface of the piston. The flanges of said ring protect the chambered rubber ring J from the damaging effect of said lubricant. The water under pressure, which moves the piston upward, passes from the passage 3 around the piston and through the annular passage $z$ into the chamber K within said rubber ring. The force of said water-pressure against the wall of said last-named chamber, which is opposite the piston, is communicated to the flange 5 of the leather reinforcing-ring, and said flange is thereby held tightly against the piston and leakage of water is prevented.

The usual cushion-springs $d\,d$ for arresting the elevator-cage at the end of its downward movement are shown on the cylinder A.

Having thus described my invention, what I claim, and desire to secure by Letters Patent, is—

1. A packing for pistons of the class described, consisting of a rubber ring having an annular chamber therein open at the lower edge thereof, and an annular lip on its inner side near said lower edge, combined with a leather reinforcing ring covering the upper edge of said rubber ring and that part of the inner surface thereof above said lip, substantially as set forth.

2. Means for packing the pistons of hydraulic elevators consisting of the combination with a piston cylinder A, thereof, having a packing chamber therein, and a water passage leading from said cylinder to said chamber, of a rubber ring having an annular chamber therein open at one edge of the ring and communicating with said water passage, and having an annular lip $h$, around the lower edge of its inner surface, and a leather reinforcing ring covering the upper edge of said rubber ring and that part of the inner surface thereof above said lip, substantially as set forth.

3. The cylinder A, having the water passage 3, and the chamfered surface $z$, at the edge of the base of the packing chamber therein, combined with the packing ring J, having the annular chamber K, therein and the annular lip $h$, therein extending parallel with said chamfered surface and forming the water passage $z$, between said chamber K, and water passage 3, substantially as set forth.

LEWIS B. WRIGHT.

Witnesses:
H. A. CHAPIN,
K. I. CLEMONS.